United States Patent
Ail et al.

(10) Patent No.: US 10,187,474 B2
(45) Date of Patent: Jan. 22, 2019

(54) METHOD AND DEVICE FOR RESOURCE SHARING BETWEEN DEVICES

(71) Applicant: Samsung Electronics Co., Ltd., Gyeonggi-do (KR)

(72) Inventors: Rohit Ail, Middlesex (GB); Nigel Cardozo, Middlesex (GB); Woo-Sung Choi, Seoul (KR); Kupesan Kulendiran, Middlesex (GB); Ziran Sun, Middlesex (GB)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 425 days.

(21) Appl. No.: 13/960,373

(22) Filed: Aug. 6, 2013

(65) Prior Publication Data

US 2014/0047048 A1    Feb. 13, 2014

(30) Foreign Application Priority Data

Aug. 8, 2012  (GB) .................... 1214144.6
Jul. 31, 2013  (KR) ................ 10-2013-0090946

(51) Int. Cl.
*H04L 29/08* (2006.01)
*H04L 29/06* (2006.01)
*H04L 12/28* (2006.01)

(52) U.S. Cl.
CPC ........ *H04L 67/141* (2013.01); *H04L 12/2809* (2013.01); *H04L 29/08153* (2013.01); *H04L 63/08* (2013.01); *H04L 63/10* (2013.01); *H04L 67/16* (2013.01); *H04L 2012/2841* (2013.01)

(58) Field of Classification Search
CPC ... H04L 67/10; H04L 67/42; G06F 17/30864; G06F 3/0481; G06Q 30/02; G06Q 30/0261
See application file for complete search history.

(56) References Cited

U.S. PATENT DOCUMENTS

| | | | |
|---|---|---|---|
| 7,136,062 B1 * | 11/2006 | Butler | G06Q 10/10 345/422 |
| 7,747,747 B1 * | 6/2010 | Arnold | H04L 41/26 709/223 |
| 8,737,801 B2 * | 5/2014 | Putterman | H04N 5/76 386/212 |

(Continued)

FOREIGN PATENT DOCUMENTS

| | | |
|---|---|---|
| KR | 10-2010-0114407 A | 10/2010 |
| KR | 10-2012-0028757 A | 3/2012 |

*Primary Examiner* — Ninos Donabed
(74) *Attorney, Agent, or Firm* — Cha & Reiter, LLC

(57) ABSTRACT

Electronic devices and methods communicate over a network with at least one other electronic device within a group of electronic devices. Each electronic device can transmit and/or receive resource information over the network, and the resource information includes a resource identifier for identifying a remote resource accessible through another electronic device and source information for identifying a location from which the remote resource can be obtained. An electronic device can select one of a plurality of resources including the remote resource, and in response to the remote resource being selected, requests the selected remote resource from the location identified by the source information in order to share the remote resource.

28 Claims, 10 Drawing Sheets

| CRITERIA | RESOURCE 1 | RESOURCE 2 | RESOURCE 3 |
|---|---|---|---|
| Last Access | 2 | 1 | 0 |
| Resource State | 3 | 3 | 3 |
| Attributes | 2 | 4 | 1 |
| Usage History | 1 | 4 | N/A |
| Total Score | 8 | 12 | 4 |

(56) References Cited

U.S. PATENT DOCUMENTS

| | | | | |
|---|---|---|---|---|
| 2004/0030743 | A1* | 2/2004 | Hugly | G06F 9/465 709/203 |
| 2005/0138193 | A1* | 6/2005 | Encarnacion et al. | 709/230 |
| 2006/0161635 | A1* | 7/2006 | Lamkin | G06F 17/30041 709/217 |
| 2006/0195462 | A1* | 8/2006 | Rogers | G06F 17/30766 |
| 2006/0218601 | A1* | 9/2006 | Michel | H04N 7/17318 725/87 |
| 2007/0083899 | A1* | 4/2007 | Compton | H04L 41/0806 725/87 |
| 2007/0097910 | A1* | 5/2007 | Ji | H04B 7/026 370/329 |
| 2007/0244894 | A1* | 10/2007 | St. Jacques | H04L 67/104 |
| 2008/0009344 | A1* | 1/2008 | Graham | G07F 17/32 463/25 |
| 2008/0037571 | A1* | 2/2008 | Hetzel | H04L 12/2805 370/408 |
| 2008/0077635 | A1* | 3/2008 | Sporny | G06F 17/30206 |
| 2008/0091812 | A1* | 4/2008 | Lev-Ran et al. | 709/223 |
| 2008/0168130 | A1* | 7/2008 | Chen | G06F 9/5027 709/203 |
| 2009/0183199 | A1* | 7/2009 | Stafford | H04H 60/375 725/34 |
| 2009/0265255 | A1* | 10/2009 | Jackson | G06F 17/30973 705/26.1 |
| 2009/0287652 | A1* | 11/2009 | Chen | H04L 12/2812 |
| 2010/0049606 | A1* | 2/2010 | Trzybinski | G06Q 30/0255 705/14.53 |
| 2010/0082784 | A1* | 4/2010 | Rosenblatt et al. | 709/222 |
| 2010/0105454 | A1* | 4/2010 | Weber | G06Q 30/02 463/1 |
| 2010/0106742 | A1* | 4/2010 | Guruswamy | 707/773 |
| 2010/0188575 | A1* | 7/2010 | Salomons | H04N 5/50 348/553 |
| 2010/0202345 | A1* | 8/2010 | Jing et al. | 370/328 |
| 2011/0137986 | A1* | 6/2011 | Wolf | G06F 17/3089 709/204 |
| 2011/0177804 | A1* | 7/2011 | Lindner | H04W 76/005 455/422.1 |
| 2012/0069131 | A1* | 3/2012 | Abelow | G06Q 10/067 348/14.01 |
| 2012/0155248 | A1* | 6/2012 | Na | H04L 12/185 370/221 |
| 2013/0159520 | A1* | 6/2013 | Engelhart | 709/225 |
| 2013/0318572 | A1* | 11/2013 | Singh et al. | 726/4 |
| 2014/0036754 | A1* | 2/2014 | Narasimhan | H04W 4/08 370/312 |
| 2014/0036917 | A1* | 2/2014 | Schrum, Jr. | H04L 61/103 370/392 |
| 2015/0005026 | A1* | 1/2015 | Wild et al. | 455/522 |

* cited by examiner

| CRITERIA | RESOURCE 1 | RESOURCE 2 | RESOURCE 3 |
|---|---|---|---|
| Last Access | 2 | 1 | 0 |
| Resource State | 3 | 3 | 3 |
| Attributes | 2 | 4 | 1 |
| Usage History | 1 | 4 | N/A |
| Total Score | 8 | 12 | 4 |

| RESOURCE ID | RESOURCE AVAIL. | DEVICE PRESENT | IN USE | PARALLEL USE | INT. |
|---|---|---|---|---|---|
| 001 | Unavailable | No | N/A | N/A | N/A |
| 002 | Available | Yes | No | N/A | N/A |
| 003 | Available | Yes | Yes | Yes | N/A |
| 004 | Available | Yes | N/A | N/A | Yes |
| 005 | Unavailable | Yes | Yes | No | No |

METHOD AND DEVICE FOR RESOURCE SHARING BETWEEN DEVICES

CLAIM OF PRIORITY

This application claims, pursuant to 35 U.S.C. § 119(a), priority to and the benefit of the earlier filing date of an Application filed in the Great Britain Intellectual Property Office on Aug. 8, 2012 and assigned Ser. No. GB 1214144.6, and a Korean patent application filed in the Korean Intellectual Property Office on Jul. 31, 2013, and assigned Ser. No. 10-2013-0090946, the entire disclosures of which are incorporated herein by reference.

BACKGROUND

1. Field of the Invention

The present disclosure relates to resource sharing between devices. In particular, the present disclosure relates to transmitting and receiving resource information for identifying a resource accessible through a device over a network.

2. Description of the Related Art

In the prior art, technological advances have resulted in an increasing number of devices becoming commercially available that include networking capabilities. Originally restricted to desktop computers, it is now common for devices such as televisions and mobile telephones ("smartphones"), and even household appliances such as refrigerators, to include network interfaces. Typically, a central server or hub is required to manage devices in a home network, which is configured to maintain a permanent network in which the same security settings are applied to communications between all devices on the network. As network connections become more common in mobile devices such as tablet computers, personal digital assistants (PDAs), laptop computers and smartphones, there is a need for a flexible approach to network management that can respond to different devices frequently joining and leaving the network, and that can allow efficient resource sharing between such devices. In the prior art, the only way to add new functionality to a device is to upgrade to a newer version of the device that includes the desired functionality, for example upgrading a non-Global Positioning System (non-GPS) digital camera to a GPS-enabled camera to allow geo-tagging of photos. The present invention is made in this context.

SUMMARY

According to the present invention there is provided an electronic device for communicating over a network with at least one other device within a group of devices, the electronic device comprising a resource information collecting module receives resource information from the at least one other device, with the resource information including a resource identifier for identifying a remote resource accessible through the other device and source information for identifying a location from which the remote resource can be obtained, and a selection module for selecting one of a plurality of resources including the remote resource, wherein in response to the remote resource being selected, the device requests the selected remote resource from the location identified by the source information.

Prior to receiving the resource information the device can determine whether the group of devices exists and to request the resource information from the at least one other device if the group of devices exists, or set up the group of devices if the group does not exist, and can set up the group of devices by broadcasting a group setup message over the network to invite the at least one other device to join the group.

After broadcasting the group setup message the device can respond to a request from a specific device of the at least one other device to join the group by authenticating the specific device, and transmitting an authorization token to the specific device in response to a successful authentication result, the authorization token comprising a token for use in authenticating communications between devices in the same group.

The device can determine whether the group of devices exists by broadcasting a group search message including a predetermined group identifier for identifying the group, waiting a predetermined time, and determining that the group does not exist if a response indicating the existence of the group is not received from the network within the predetermined time.

The device can further obtain location information about a current location of the device, and to determine whether the group of devices exists in response to the location information indicating that the device is at a predetermined location.

Prior to receiving the resource information the device can broadcast a resource information request including a predetermined group identifier for identifying the group of devices, to request resource information from any devices on the network that are included in the group.

When resource information for a plurality of resources is received the device can determine based on the received resource identifiers whether one specific resource of the plurality of resources can be obtained from a plurality of different locations, and in response to the selection module selecting the specific resource, the device can select a preferred one of the plurality of different locations from which to request the resource based on predetermined criteria.

The selection module can rank the plurality of resources according to at least one predetermined ranking criteria, before selecting one of the resources.

The selection module can rank the plurality of resources based on, for each one of the plurality of resources, information about: a time since the resource was last accessed; and/or a current state of the resource; and/or an attribute score of the resource; and/or a usage history of the resource.

The resource information can include type information for identifying a type of the remote resource, and in response to the selection module selecting one of the resources, the device can determine based on the resource information whether an alternative resource of the same type as the selected resource and having a higher ranking than the selected resource is available.

The device can further transmit local resource information to the at least one other device in the group over the network, the local resource information comprising information about a resource accessible through the device.

The device can store the received resource information for a predetermined time period and request updated resource information from the other device after the predetermined time period has expired, and in response to updated resource information not being received, the device can delete the stored resource information for the other device.

The selection module can select one of the plurality of resources in response to user input, by providing a user with information about the plurality of resources and receiving a user command selecting one of the plurality of resources.

According to the present invention, there is also provided a device for communicating over a network with at least one other device within a group of devices, the device comprising a resource information providing module to generate resource information including a resource identifier for identifying a resource accessible through the device and source information for identifying a location from which the remote resource can be obtained, and to transmit the resource information to the at least one other device over the network, wherein in response to a request to use the resource received from a specific device of the at least one other device, the device provides the requested resource to the at least one other device.

The device can communicate over a first network according to a first network protocol and to communicate over a second network according to a second network protocol, wherein the group of devices may include a first other device on the first network and a second other device on the second network, and wherein in response to a request for resource information from the first other device, the resource information providing module can transmit resource information about a remote resource provided by the second other device and accessible through the device.

In response to a request from the first other device to access the remote resource, the device can request the remote resource from the second other device to provide the remote resource to the first other device.

The request received from the specific device may include a group identifier for identifying the group of devices, and the device can determine whether authentication is required in the identified group, and in response to a determination that authentication is required, can authenticate the specific device before providing the requested resource.

According to the present invention there is further provided a method for use in a device for communicating over a network with at least one other device within a group of devices, the method comprising receiving resource information from a specific device of the at least one other device, the resource information including a resource identifier for identifying a remote resource accessible through the other device and source information for identifying a location from which the remote resource can be obtained, selecting one of a plurality of resources including the remote resource, and requesting the selected remote resource from the location identified by the source information, in response to the remote resource being selected.

The method can further comprise prior to receiving the resource information, determining whether the group of devices exist, requesting the resource information from the specific device if the group of devices exists, and setting up the group of devices if the group does not exist, by broadcasting a group setup message over the network to invite the at least one other device to join the group.

The method can further comprise after broadcasting the group setup message, responding to a request from a specific device of the at least one other device to join the group by authenticating the specific device, and transmitting an authorization token to the specific device in response to a successful authentication result, the authorization token comprising a token for use in authenticating communications between devices in the same group.

Determining whether the group of devices exists can comprise broadcasting a group search message including a predetermined group identifier for identifying the group, waiting a predetermined time, and determining that the group does not exist if a response indicating the existence of the group is not received from the network within the predetermined time.

The method can further comprise obtaining location information about a current location of the device, wherein it is determined whether the group of devices exists in response to the location information indicating that the device is at a predetermined location.

The method can further comprise prior to receiving the resource information, broadcasting a resource information request including a predetermined group identifier for identifying the group of devices, to request resource information from any devices on the network that are included in the group.

When resource information for a plurality of resources is received, the method can further comprise determining based on the received resource identifiers whether a specific resource of the resources can be obtained from a plurality of different locations, and selecting a preferred one of the plurality of different locations from which to request the resource based on predetermined criteria, in response to the specific resource being selected.

The method can further comprise ranking the plurality of resources according to at least one predetermined ranking criteria, before selecting one of the resources.

The plurality of resources can be ranked based on, for each one of the plurality of resources, information about: a time since the resource was last accessed; and/or a current state of the resource; and/or an attribute score of the resource; and/or a usage history of the resource.

The resource information can include type information for identifying a type of the remote resource, and the method can further comprise determining based on the resource information whether an alternative resource of the same type as the selected resource and having a higher ranking than the selected resource is available, in response to the specific resource being selected.

The method can further comprise transmitting local resource information to the at least one other device in the group over the network, the local resource information comprising information about a resource accessible through the device.

The method can further comprise storing the received resource information for a predetermined time period, requesting updated resource information from the other device after the predetermined time period has expired, and deleting the stored resource information for the other device, in response to updated resource information not being received.

Selecting the specific resource of the plurality of resources can comprise providing a user with information about the plurality of resources, and receiving a user command selecting one of the plurality of resources.

According to the present invention, there is further provided a method for use in a device for communicating over a network with a specific device of the at least one other device within a group of devices, the method comprising generating resource information including a resource identifier for identifying a resource accessible through the device and source information for identifying a location from which the remote resource can be obtained, transmitting the resource information to the at least one other device over the network, receiving a request to use the resource from the specific device, and providing the requested resource to the specific device.

The device can communicate over a first network according to a first network protocol and to communicate over a second network according to a second network protocol, wherein the group of devices may include a first other device on the first network and a second other device on the second network, and wherein in response to a request for resource information from the first other device, resource information about a remote resource provided by the second other device and accessible through the device can be transmitted to the first other device.

The method may further comprise requesting the remote resource from the second other device to provide the remote resource to the first other device, in response to a request from the first other device to access the remote resource.

The request received from the specific device may include a group identifier for identifying the group of devices, and the method may further comprise determining whether authentication is required in the identified group, and authenticating the specific device before providing the requested resource, in response to a determination that authentication is required.

A non-transitory computer-readable storage medium may store a computer program which, when executed, performs the method.

BRIEF DESCRIPTION OF THE DRAWINGS

Exemplary embodiments of the present invention will now be described, by way of example only, with reference to the accompanying drawings, in which.

DETAILED DESCRIPTION

Figure 1:
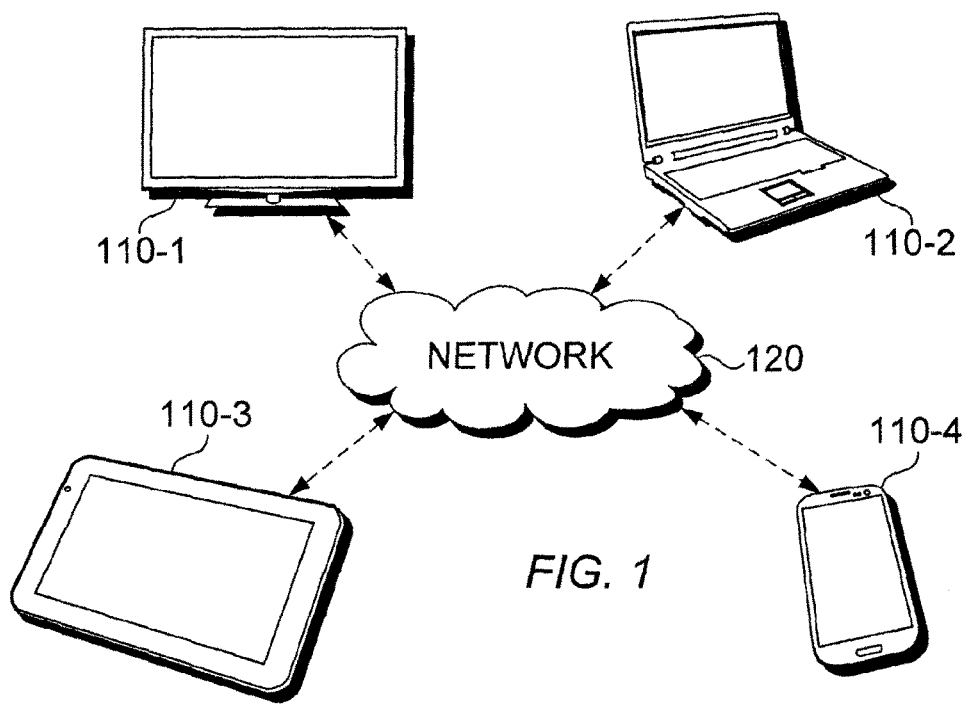
FIG. 1 illustrates a group of devices to communicate over a network, according to an exemplary embodiment of the present invention.

Exemplary embodiments of the present invention will be described with reference to the accompanying drawings. In the following description, a detailed explanation of known related functions and constructions may be omitted to avoid unnecessarily obscuring the subject matter of the present invention. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous exemplary embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal, a mobile device, a portable device, or an electronic device refers to any kind of device capable of processing data which is transmitted or received to or from any external entity. The terminal, the mobile device, the portable device, or the electronic device may display icons or menus on a screen to which stored data and various executable functions are assigned or mapped. The terminal, the mobile device, the portable device, or the electronic device may include a computer, a notebook, a tablet PC, a cellphone, and any known type of electronic device.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the electronic device such that a user can easily select a desired function or data. In particular, each icon has a mapping relation with any function being executable in the electronic device or with any data stored in the electronic device and is used for processing functions or selecting data in the electronic device. When a user selects one of the displayed icons, the electronic device identifies a particular function or data associated with the selected icon. Then the electronic device executes the identified function or displays the identified data.

Among the terms set forth herein, data refers to any kind of information processed by the electronic device, including text and/or images received from any external entities, messages transmitted or received, and information created when a specific function is executed by the electronic device.

Among the terms set forth herein, a device refers to an electronic device such as a terminal, a mobile device, a portable device, or any other known type of electronic device.

Referring now to FIG. 1, a group of electronic devices which communicate over a network is illustrated, according to an exemplary embodiment of the present invention. In the exemplary embodiment, the group includes a television, monitor, or display unit 110-1, a laptop computer 110-2, a tablet computer 110-3 and a smartphone or personal digital assistant (PDA) 110-4. The group of electronic devices communicate over a wireless network 120, such as a network using WI-FI, a wireless technology for data exchange over a computer network, commercially available from the WI-FI ALLIANCE, although in other exemplary embodiments any type of network, wired and/or wireless, could be used. Also, although certain types of electronic devices are shown in FIG. 1, in general exemplary embodiments of the present invention can include any type of electronic device that is capable of communicating over a network with other devices. Examples of other types of devices that can be included in a group of devices similar to that shown in FIG. 1 include, but are not limited to, audio hi-fi equipment, home media servers, set-top boxes, digital versatile disc (DVD) players, and smart appliances such as refrigerators and washing machines that feature integrated network interfaces.

Each of the electronic devices 110-1, 110-2, 110-3, 110-4 includes at least a controller, a storage unit, an input device and an output device. The controller may include a central processing unit (CPU), a processor, a microprocessor, or any other known type of electronic control unit. The storage unit may be a memory and any other known type of storage devices for storing data and software such as an operating system and an application program for operating the electronic device as described herein for the present invention. The input device may be a remote control device for a television 110-1, at least one key or button, and/or a touch screen on a display unit, or any other known type of input device. The output device may include at least a display unit having a screen, which may be a touch screen, and may also include a speaker for audio outputs, as well as any other known type of output device.

The devices 110-1, 110-2, 110-3, 110-4 within the group of devices shown in FIG. 1 communicate over the network 120 in order to share resources between the devices 110-1, 110-2, 110-3, 110-4. In particular, a first device that has access to at least one shareable resource, which may be resources that are local to the first device or are accessible by the first device over the network 120, transmits resource information about the shareable resources to a second device over the network 120. For example, the television 110-1 may share the data, used to generate an image on a display screen of the television 110-1, with any of the other devices 110-2, 110-3, 110-4 or other devices of the same or different types as the television 110-1, and so may transmit resource information about the display screen over the network 120, or a camera without GPS functionality could access a GPS module being shared by a smartphone in order to obtain a GPS location to apply geo-tagging to photos. The resource information can be received by one of the other devices, for example the smartphone 110-4, which can then use the resource information to request access to the display screen of the television 110-1 over the network 120. This allows the smartphone 110-4, or any other device, which receives the resource information from the television 110-1, to access the large display screen of the television 110-1. For example, the smartphone 110-4 can request access to the large display screen in order to display a video file or a still image through the television 110-1.

A shareable resource can be any type of resource, for example a hardware resource such as a display, a storage unit or memory (e.g. hard disk drive), a speaker, or a software resource such as a multimedia file or an application.

In general, any device in the group of devices 110-1, 110-2, 110-3, 110-4 may transmit and/or receive resource information. It is not essential for every device participating in the group of devices to share a resource. That is, any given device may only transmit resource information, only receive resource information, or both receive and transmit resource information, as required. Specifically, a device may transmit resource information if the device has any resources to share, and may receive resource information if access to shareable resources is required. As an example, a device such as a media server may transmit resource information to share recorded multimedia files with other devices on the network 120, but may not require access itself to any shared resources and hence may not receive any resource information from the other devices. On the other hand, a device such as a smartphone may not have any resources to share and hence may only receive resource information from other devices without transmitting any resource information itself. These scenarios are exemplary, and in other situations, for example, a media server may also receive resource information and/or a smartphone may also transmit resource information to share resources.

Figure 2:
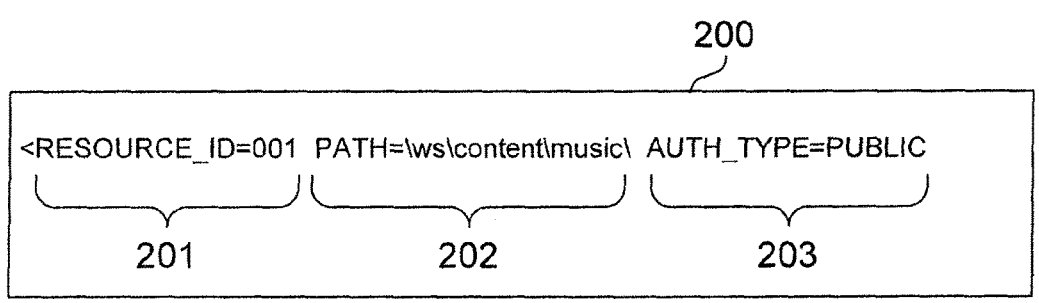
FIG. 2 illustrates a format for transmitting resource information from one device to another, according to the exemplary embodiment of the present invention.

An example of resource information transmitted from one device to another is illustrated in FIG. 2, according to the exemplary embodiment of the present invention. In this exemplary embodiment an extensible mark-up language (XML) format is used for the resource information, but the invention is not limited to XML and in other exemplary embodiments other formats could be used, such as a Hyper-Text Markup Language (HTML), a Standard Generalized Markup Language (SGML), or any other known information formats. As shown in FIG. 2, the resource information 200 includes a resource identifier 201 for identifying the shared resource, which is a resource accessible through the device transmitting the resource information 200, and source information for identifying a location from which the resource can be obtained.

The source information can take various forms. In the present example shown in FIG. 2, the source information includes a device identifier for identifying the device which supplied the resource information, and a path information 202 for identifying a path through which the resource can be accessed. The source information in FIG. 2 includes device identifiers such as the examples of the device identifiers (device_ID) 301, 302 shown in FIG. 3. Referring back to FIG. 2, in the present example the path information 202 specifies a directory on the device which provided the resource information. The resource can be obtained by requesting the resource from a Uniform Resource Identifier (URI) obtained by combining the path information <path> with a device identifier <device_ID>, for example an Internet Protocol (IP) address:

<device_ID>/<path>

When a device is sharing a plurality of resources, the path information 202 can specify the location of each resource on the device. However, in some exemplary embodiments the path information 202 can be omitted and the source information may only include the device identifier. For instance, if a device is only sharing a single resource, only the device identifier can be provided. Any other device can access the shareable resource by sending a resource access request to the device, without knowing a specific location on the device, and the device can respond to all resource access requests by providing the single shared resource.

From the point of view of the device receiving the resource information 200, the shared resource can be referred to as a remote resource, that is, a resource remote from the device and accessible over the network 120, as opposed to a local resource included in the device. Furthermore, in the exemplary embodiment the resource information 200 includes authentication information 203 for identifying a type of authentication to be used when accessing the shared resource. However, in other exemplary embodiments, the authentication information 203 can be omitted, for example if the same authentication type will be used for all resources in the group of devices or if no authentication is to be used.

A device that receives the resource information 200 can select one specific resource of a plurality of resources including the remote shareable resource, and if the remote resource is selected, can use the received resource information to request access to that remote resource. Various approaches are possible for selecting a resource, and will be described later in more detail. However, as an example, when the smartphone 110-4 of FIG. 1 is playing a multimedia file or is about to begin playback of a multimedia file, the smartphone 110-4 can determine, based on received resource information, that a larger display screen is available from the television 110-1, and can request a user to select whether to continue reproducing the multimedia file on the smartphone screen or on the television screen. If the user selects the television screen, which is a remote resource shared by the television 110-1, the smartphone 110-4 requests access from the location defined by the source information 202 associated with the resource identifier of the selected remote resource, i.e. the television screen, to reproduce the multimedia file through the television.

Figure 3:
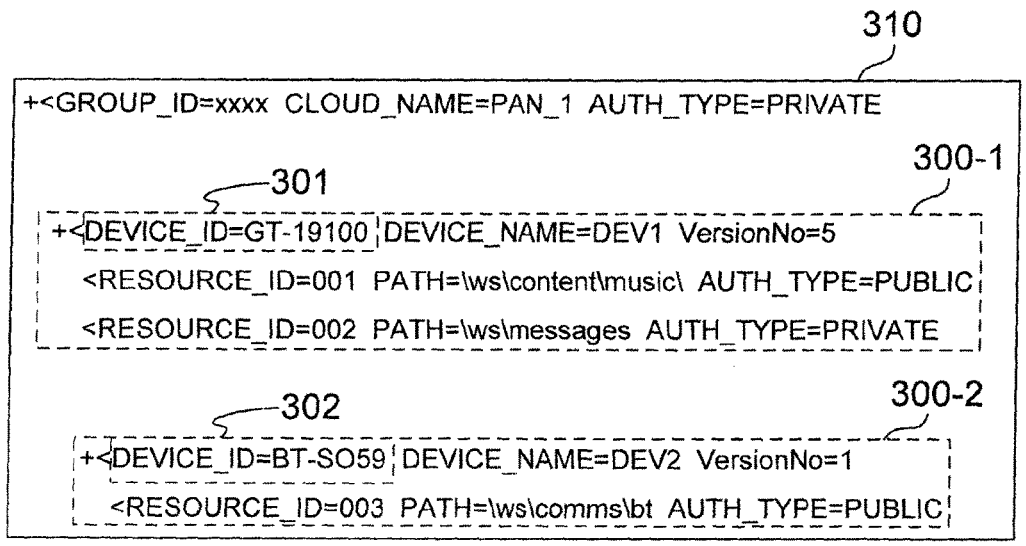
FIG. 3 illustrates a format for storing received resource information, according to the exemplary embodiment of the present invention.

Referring now to FIG. 3, a file format for storing received resource information is illustrated, according to the exemplary embodiment of the present invention. In the exemplary embodiment of the present invention a device stores resource information received from different devices in a single file 310, which may be referred to as a resource catalog. The resource catalog 310 can be updated whenever new resource information is received, by adding the new resource information to the catalog file. Alternatively, in other exemplary embodiments resource information received from different devices may be stored separately. As in the exemplary embodiment of FIG. 2, an extensible mark-up language (XML) format is used for the resource catalog 310 in the exemplary embodiment, but the present invention is not limited to XML and in other exemplary embodiments any other known formats could be used.

As shown in FIG. 3, the resource catalog 310 in the present example includes first resource information 300-1 received from a first device, and second resource information 300-2 received from a second device. In the resource catalog 310 each received resource information 300-1, 300-2 is associated with a device identifier 301, 302, respectively, for identifying the device from which the resource information 300-1, 300-2 was received. Specifically, the first resource information 300-1 is associated with a device identifier 301 of the first device, and the second resource information 300-2 is associated with a device identifier 302 of the second device.

Inclusion of the device identifier 301, 302 in the catalog 310 can assist in catalog management. For instance, in some exemplary embodiments a device can leave a group by broadcasting a leaving message over the network 120 to be received by other devices in the group. When a device receives a leaving message, the device can update its catalog 310 by deleting the stored resource information including the device identifier 301, 302 of the device from which the leaving message was received. Similarly, if updated resource information is received, a device can determine which of the resource information in the catalog 310 is to be replaced with the updated information based on the device identifier 301, 302. Therefore the device identifier 301, 302 can serve two functions, for example, identifying the location from which a resource can be obtained, and enabling efficient management of stored resource information for a plurality of devices.

Figure 4:
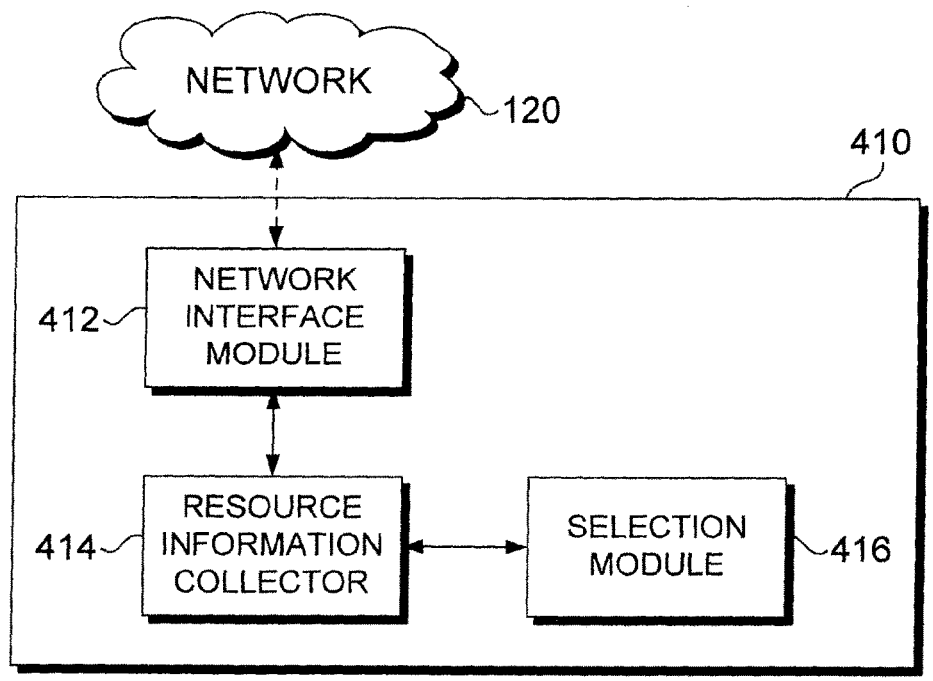
FIG. 4 illustrates a device for receiving resource information about a shareable resource, according to the exemplary embodiment of the present invention.

Referring now to FIG. 4, a device 410 for receiving resource information about a shareable resource is illustrated, according to the exemplary embodiment of the present invention. The device 410 is able to communicate with other devices in a group of devices over the network 120, via a network interface module 412. The network interface module 412 may be included in the device 410, as shown in FIG. 4, or in alternative exemplary embodiments may be accessed through a separate device to which the device 410 is connected. In addition to the network interface module 412, the device 410 comprises a resource information collector or collecting module 414 which receives resource information over the network 120 from another device in the group of devices, and a selection module 416 for selecting one resource of a plurality of resources including the remote resource identified by the received resource information. The selection module 416 may include or be connected to any known input device of the electronic devices 110-1, 110-2, 110-3, and 110-4, such as keypads, remote controls with keys and buttons, and a touch screen. Using the input device, a user enters a user command or selection to select a specific resource of the plurality of resources, and the selection module 416, in response to the user input, provides a user with information about the plurality of resources and selects the specific resource of the plurality of resources.

In response to the remote resource being selected, the device 410 requests the selected remote resource from the location identified by the source information in the received resource information. The resource information collecting module 414 can store the received resource information in the catalog 310 as shown in FIG. 3 or in any other format, and can store the received resource information in an internal storage module of the device 410 or in a separate storage module, for example an external hard disk drive.

By collecting resource information from other devices in the group of devices, the device 410 of FIG. 4 is able to build up a collection of information about shareable resources that can be accessed over the network 120. The device 410 can therefore select a shareable resource, for example by selecting the resource automatically when a particular condition is met or by selecting the resource in response to user input, and can request access to the resource based on the stored resource information. Because the device 410 already has the necessary information required to access the resource, there is no need to provide a separate network management apparatus to store and manage data repositories for holding access information about shared resources.

Figure 5:
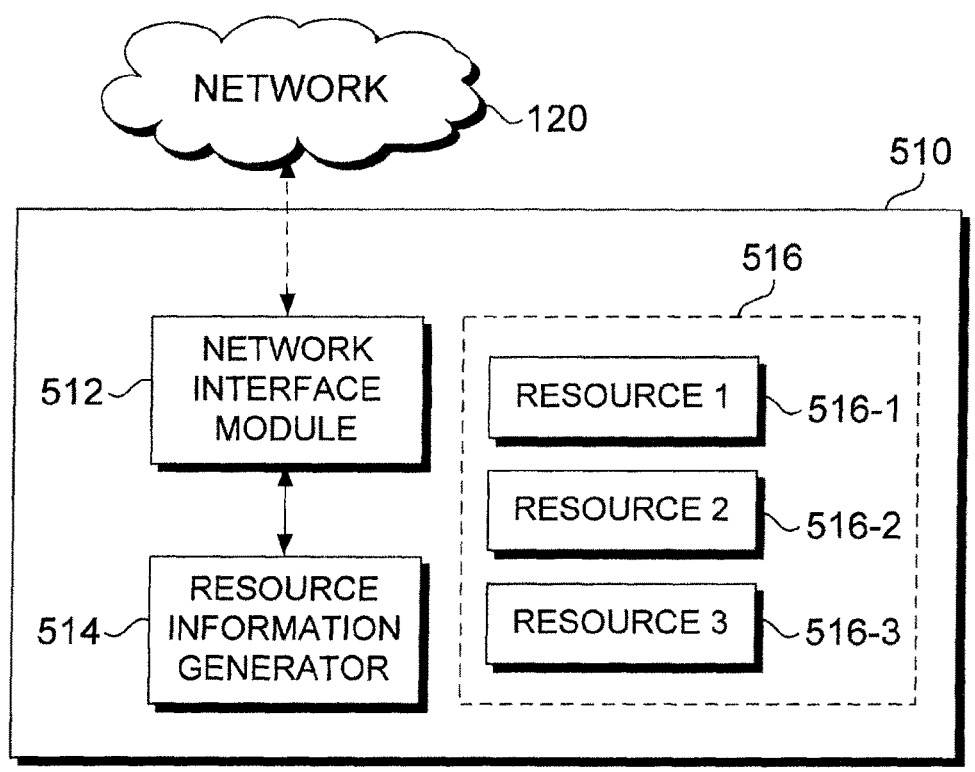
FIG. 5 illustrates a device for transmitting resource information about a shareable resource, according to the exemplary embodiment of the present invention.

Referring now to FIG. 5, an electronic device for transmitting resource information about a shareable resource is illustrated, according to the exemplary embodiment of the present invention. As in the electronic device 410 of FIG. 4, the device 510 of FIG. 5 is able to communicate with other devices in a group of devices over the network 120, via a network interface module 512 which may be included in the device 510 or accessed through a separate device. The device 510 further comprises a plurality of shareable resources 516, and a resource information generator 514, which may be a resource information providing module. The resource information generator 514 generates the resource information including a resource identifier for identifying one resource of the shareable resources 516 accessible through the device 510 and source information for identifying a location from which the resource can be obtained, and to transmit the resource information over the network 120 to other devices in the group of devices. In the exemplary embodiment the resource information is generated whenever the device 510 boots up. However, in alternative exemplary embodiments the resource information can, for example, be generated before the device 510 joins the group, while the device 510 is joining the group, or after the device 510 has joined the group and in response to a request for resource information for another device.

Furthermore, in response to a request to use the resource received from another device over the network 120, the device 510 provides the requested resource to the other device. The device 510 may include a resource access control module for controlling access to the shareable resources 516 in response to requests received from other devices, for example if authentication of the other devices is required before access can be granted.

Various methods are possible to obtain the resource identifier to be included in the resource information. In the exemplary embodiment, a universally unique identifier (UUID) is used to ensure a unique identifier for each resource 516. In an alternative exemplary embodiment, for example, a combination of device IP address and media access control (MAC) code could be used as a resource identifier.

Although in the exemplary embodiment the device 510 includes three shareable resources, i.e. a first shareable resource 516-1, a second shareable resource 516-2 and a third shareable resource 516-3, in general the device 510 may include any number of shareable resources, i.e. at least one shareable resource.

The devices 410, 510 shown in FIGS. 4 and 5, respectively, could be used as any of the devices shown in the device group of FIG. 1, and may be combined in a single device if it is required for that device to both transmit and receive resource information. Also, the separate modules shown in FIGS. 4 and 5 may in general be hardware or software modules, operating using hardware, and configured to perform the desired function. For example the resource information collection and generation, and the resource selection could be performed by software modules running on a processor and hence could be embodied as a computer program stored on a non-transitory computer-readable storage medium, such as a hard disk, an optical disk, a universal serial bus (USB) a memory stick, and other known storage media.

As in the electronic device 410 of FIG. 4, the electronic device 510 of FIG. 5 avoids the need for a separate network management apparatus because the resource information generation and transmission is handled by the same device which is sharing the resources. Therefore when a group of devices such as those devices 410, 510 shown in FIGS. 4 and 5, implementing the devices 110-1, 110-2, 110-3, 110-4, exchange resource information over a network 120, as shown in FIG. 1, resource sharing between devices can be handled in a distributed manner without having to provide a dedicated central server for the purpose of resource sharing. Accordingly, even if the group of devices was originally set up by a particular device, the remaining devices can continue to share resources even after that device has left the group because resource sharing is not controlled by any single device such as a central server. Hence, in the present invention, devices can freely join and leave the group of devices at any point, without affecting the ability of the remaining devices to share resources.

Figure 6:
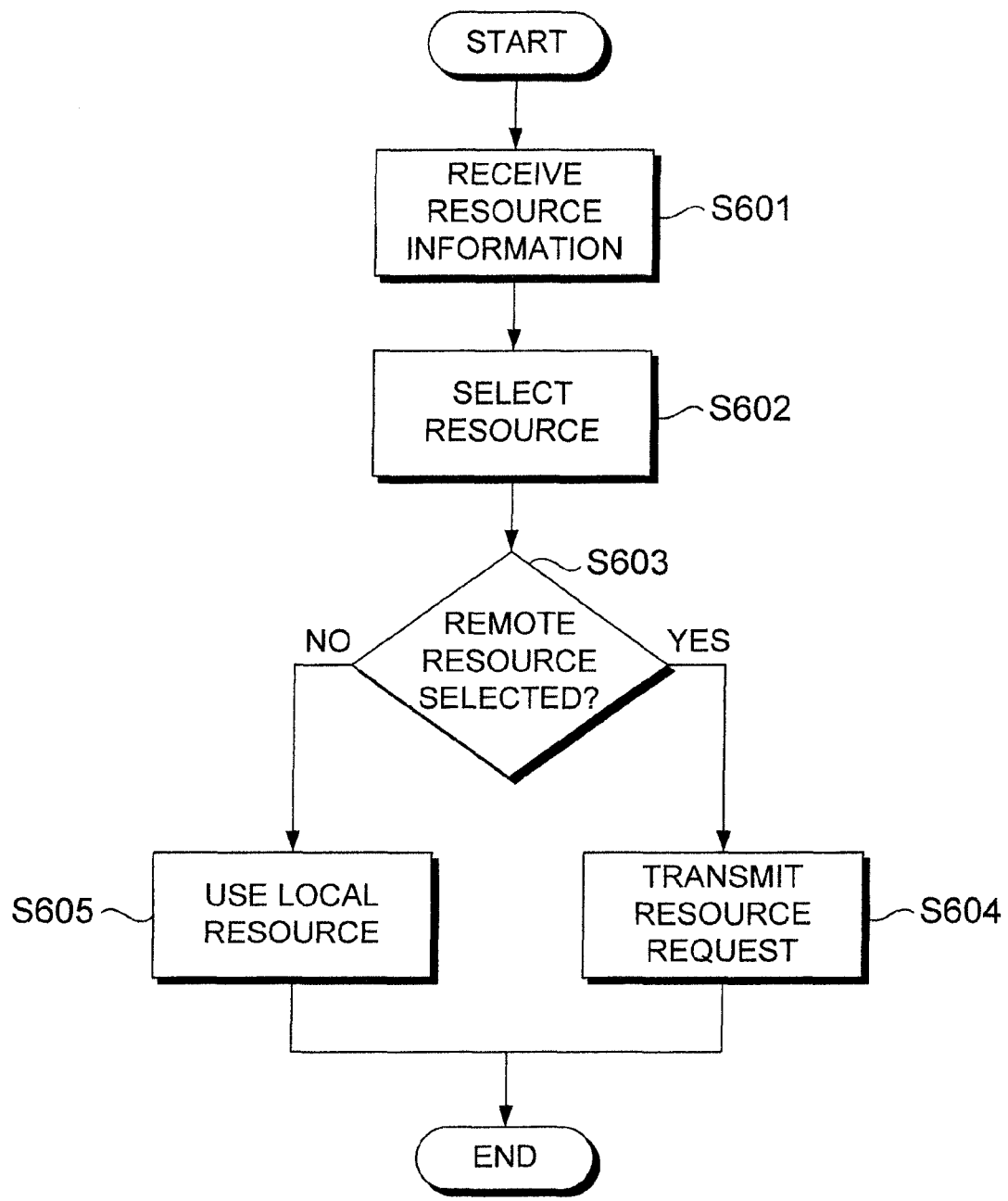
FIG. 6 illustrates a method for use in a device such as the device shown in FIG. 4, according to the exemplary embodiment of the present invention.

Referring now to FIG. 6, a method for use in a device, such as the device 410 shown in FIG. 4, is illustrated according to the exemplary embodiment of the present invention. The method could be implemented by dedicated hardware provided in the device 410, for example an application-specific integrated circuit (ASIC), or could be implemented by a computer program executed on a processor in the device 410.

Firstly, in step S601 the device 410 receives resource information from another device in the group of devices over the network 120 in FIG. 1. The resource information can be information which identifies one remote shareable resource or which identifies a plurality of remote shareable resources. At this point, the device 410 can store the received resource information, for example in the catalog 310 as shown in FIG. 3 together with resource information from other devices. Then, in step S602 one specific resource of a plurality of resources is selected, for example, by a user input, command, or selection through an input device included or connected to the selection module 416, with the plurality of resources including at least one local resource and the remote resource identified by the resource information received in step S601.

Next, in step S603 it is determined whether the remote resource was selected. If the remote resource was selected, then in step S604 the selected remote resource is requested using the location information included in the resource information received at step S601, and the method in FIG. 6 ends. On the other hand, if the selected resource was a local resource, i.e. not a remote resource being shared by another device, then in step S605 the selected local resource is used, and the method in FIG. 6 ends. Although in FIG. 6 a local resource may be selected, it is not essential in all exemplary embodiments for this to be the case. In some exemplary embodiments a resource may be selected only from a plurality of remote resources, i.e. a set of resources not including any local resources. For example, one file of a plurality of multimedia files may be selected, all of which are stored remotely and are being shared by at least one device over the network. In such exemplary embodiments steps S603 and S605 could be omitted and instead the process can proceed directly to step S604 to request the selected remote resource.

Figure 7:
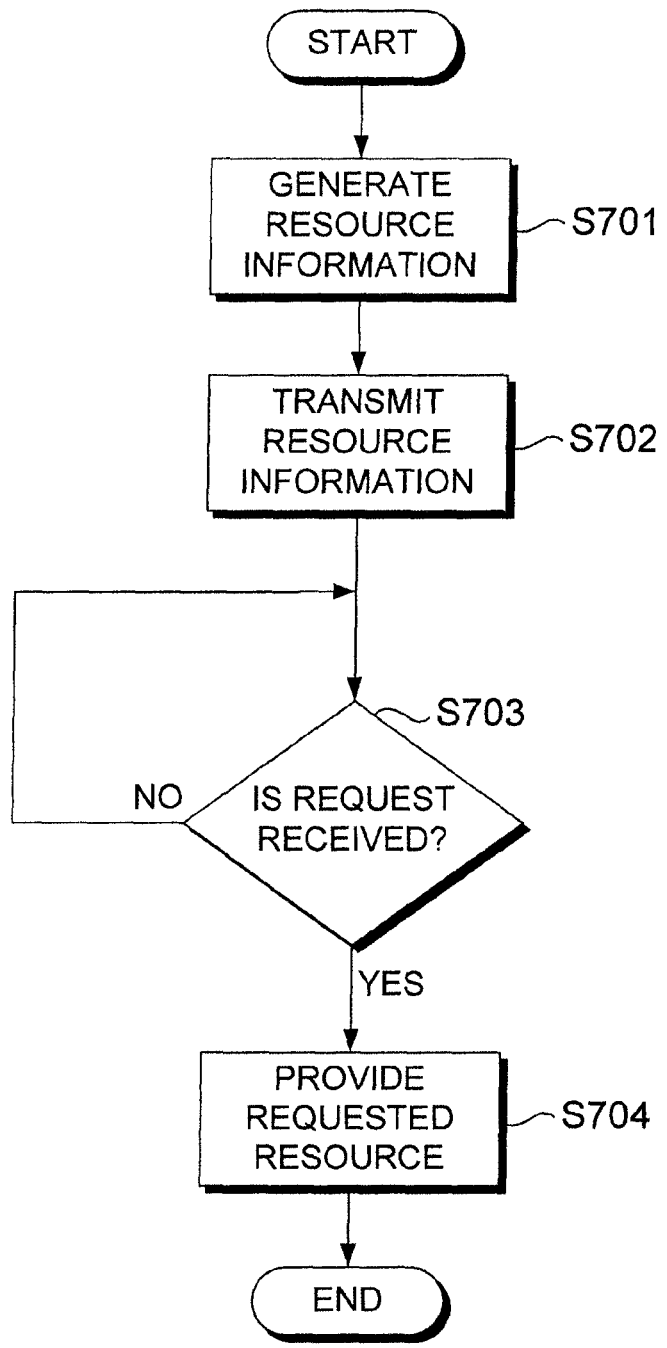
FIG. 7 illustrates a method for use in a device such as the device shown in FIG. 5, according to the exemplary embodiment of the present invention.

Referring now to FIG. 7, a method for use in a device such as the device 510 shown in FIG. 5 is illustrated, according to the exemplary embodiment of the present invention. As with FIG. 6, the method of FIG. 7 could be implemented by dedicated hardware or by a computer program executed on a processor.

Firstly, in step S701, the device 510 generates resource information which identifies at least one shareable resource accessible through the device 510. Here, the at least one shareable resource included in the resource information could be a local resource included in the device 510, a remote resource that can be accessed by the device 510 through another device, or any combination of local and remote shareable resources.

Then, in step S702, the generated resource information is transmitted to at least one other device in the group of devices. The resource information can be broadcast to all devices through the network 120, for example, when the device joins the group, the resource information can be broadcast over the network 120 to all other devices in the group. Alternatively, or in addition, the device 510 can periodically re-broadcast resource information over the network 120 and/or can transmit the resource information to a specific device in response to a request from the device 510. Also, the resource information can be generated at any point before being transmitted. In the exemplary embodiment the resource information is generated whenever the device 510 boots up. However, in alternative exemplary embodiments the resource information can, for example, be generated before the device 510 joins the group, while the device 510 is joining the group, or after the device 510 has joined the group and in response to a request for resource information for another device.

After transmitting resource information, then in step S703 the device 510 waits to receive an access request for a shareable resource from another device in the group. If no access request is received, the method loops back repeatedly to perform step S703. In response to a request being received as determined in step S703, the device 510 proceeds to step S704 and provides the resource to the requesting device. The method in FIG. 7 then ends. Here, authentication can be used to verify that the request is received from an authorized device. Depending on how the group of devices has been set up, in some exemplary embodiments it may be possible to define different types of authentication for different resources, as shown in FIGS. 2 and 3, or authentication may be required for all shareable resources. If authentication is required for the requested resource then the device 510 can authenticate the requesting device before providing the resource.

Figure 8:
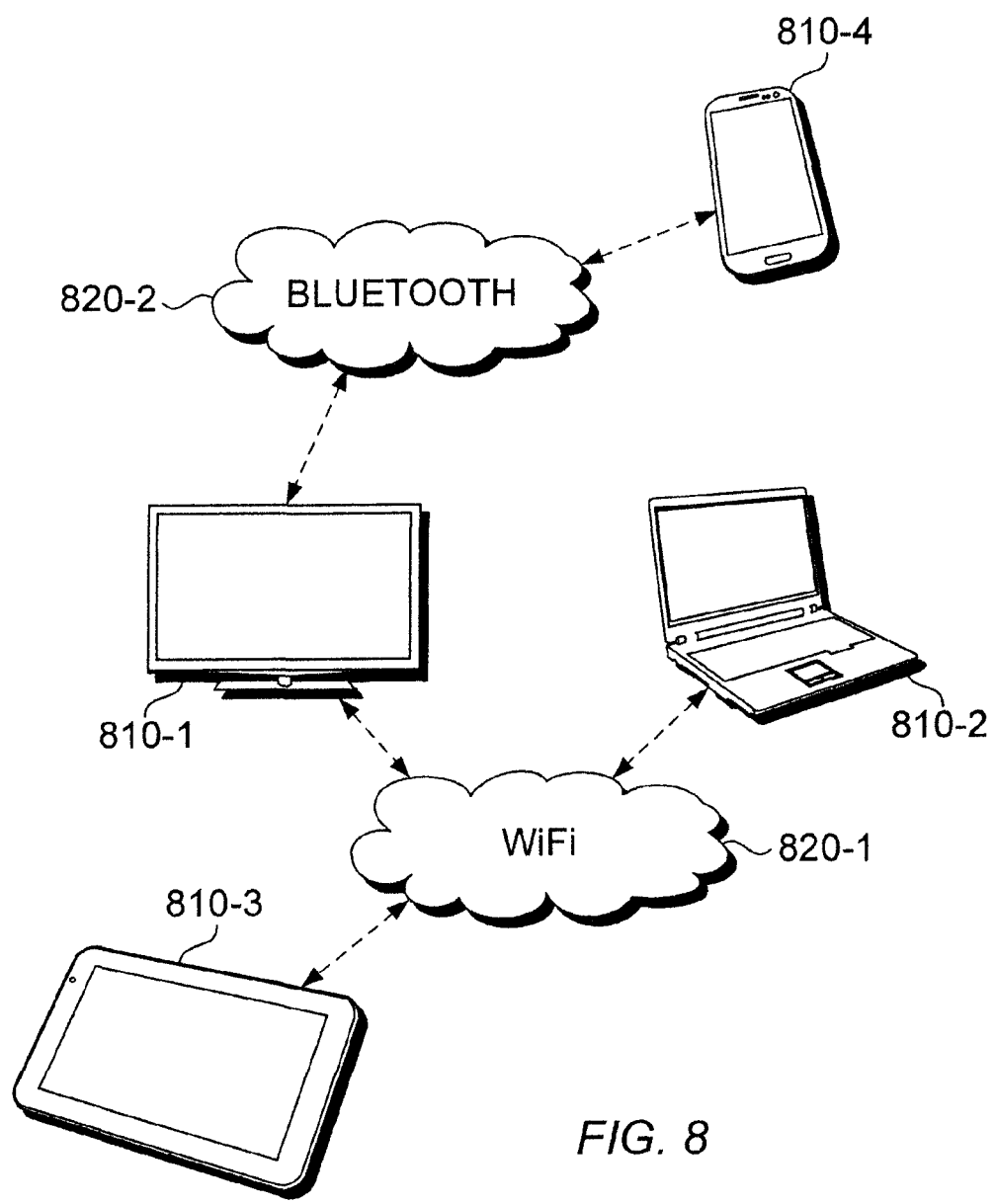
FIG. 8 illustrates a first device acting as a bridging device between two other devices on different networks, according to the exemplary embodiment of the present invention.

As described above, when generating resource information in step S701, the device 510 can include information about remote shareable resources that are accessible from another device. This allows the device 510 to act as a bridging device between two other devices in the group of devices, as shown in FIG. 8. In the example shown in FIG. 8, a first device 810-1 is compatible with two different network standards, in this case WI-FI and BLUETOOTH. The group of devices also includes a second device 810-2 and a third device 810-3 which are only compatible with WI-FI and can communicate with the first device 810-1 over a WI-FI network 820-1. The group of devices further includes a fourth device 810-4 which is only compatible with BLUETOOTH and communicates with the first device 810-1 over a network 820-2 using BLUETOOTH, a short range wireless communications technology at the 2.4 GHz band, commercially available from the BLUETOOTH SPECIAL INTEREST GROUP, INC. In this way one group of devices can include devices that communicate over more than one network type.

In the present example the first device 810-1 can act as a bridging device between the devices 810-2, 810-3, and the fourth device 810-4. Specifically, the first device 810-1 can include information about a remote shareable resource on the fourth device 810-4 in the resource information sent to the devices 810-2, 810-3. The devices 810-2, 810-3 can therefore each access the resource on the fourth device 810-4 by sending a request to the first device 810-1, which will in turn request the resource from the fourth device 810-4 in order to provide the resource to the requesting device.

As shown in FIG. 8, the first device 810-1 can operate as a bridging device when the group includes any devices that are not able to communicate directly, for example, due to incompatible network protocols. However, the use of bridging devices is not limited to situations in which different network types are used. For example, even when all devices in a group communicate over the same network, a device can still act as a bridging device by including information about remote resources in its own resource information. This may be advantageous when two devices are not able to establish a reliable direct connection, since the devices can still share resources via a third device to which both can connect reliably. For instance, environmental factors may prevent a reliable BLUETOOTH connection being formed directly between the two devices.

Exemplary embodiments of the present invention have been described in which a device can select a remote shareable resource and request access to the selected remote resource from another device in the group. To select one of a plurality of resources, the device can rank the resources according to at least one predetermined ranking criteria. In particular, a plurality of different resource types can be defined and the resource information for each resource can include type information for identifying a type of the remote shareable resource. When a resource of a particular type is required the device can rank all available resources, local and remote, of that particular type. For example, the type of required resource may be a display screen, and the device can rank all available display screens to determine the preferred screen to use. In this way, it can be determined based on the resource information whether an alternative resource of the same type as the selected resource and having a higher ranking than the selected resource is available.

Resource ranking will now be described with reference to FIG. 9, which illustrates a system for ranking resources according to the exemplary embodiments of the present invention. In the exemplary embodiment shown in FIG. 9, three resources of the same type, labeled Resource 1, Resource 2, and Resource 3, are ranked according to four predetermined criteria. In other exemplary embodiments, different criteria may be used. In the exemplary embodiment the criteria are a time since the resource was last accessed, a current state of the resource, an attribute score of the resource, and a usage history of the resource. Each resource is assigned a score in each category, and the scores for each resource are summed to give a total score. The resources can then be ranked according to their total score, with the resource with the highest score being selected as the preferred resource. In some exemplary embodiments, the ranking results may be presented to a user, for example, by being output by audio and/or visual devices such as a display which may be a touch screen on the devices 110-1, 110-2, 110-3, 110-4, to allow the user to select, through an input device and the selection module 416, the preferred resource based on the scores.

To be able to score resources in each category, it is necessary to obtain certain information about each resource. The information for a given resource can be obtained from the device which originally provided the resource information for that resource, either by being included in the resource information initially or by being received at a later stage.

Figures 9, 10, 11:
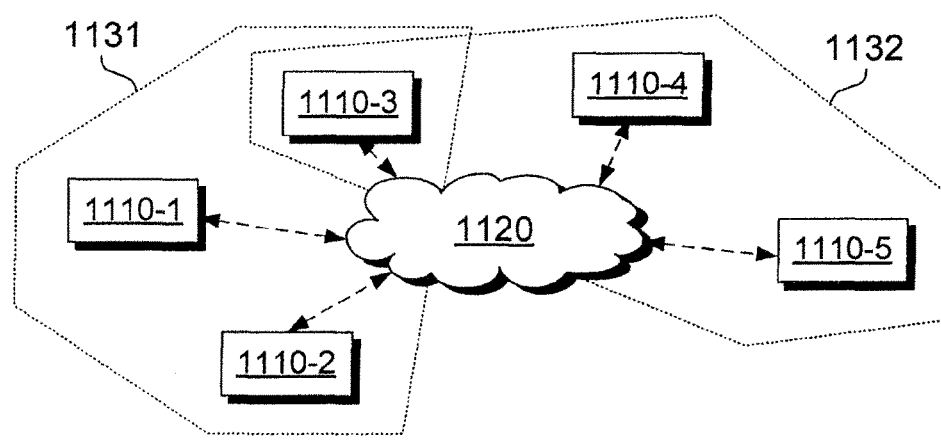
FIG. 9 illustrates a ranking of resources, according to the exemplary embodiment of the present invention.
FIG. 10 illustrates a method for determining whether a resource is currently available, according to the exemplary embodiment of the present invention.
FIG. 11 illustrates a system including two groups of devices, according to the exemplary embodiment of the present invention.

In more detail, regarding the "last access" criteria in FIG. 9, each resource can be assigned a score under this criteria which depends on how long it has been since the resource was last accessed. For example, a score of 0 may be assigned if the resource has not been accessed for more than 24 hours, a score of 1 may be assigned if the resource was accessed between 1 and 24 hours ago, and a score of 2 may be assigned if the resource was accessed less than 1 hour ago. These ranges are only exemplary and different ranges may be defined for different resources, for instance a multimedia file may be accessed much less frequently than a display screen or a speaker.

Regarding the "resource state" criteria in FIG. 9, each resource can be scored depending on a current state of the resource, which may have different meanings for different types of resource. For example, in the case of a resource which is a global positioning system (GPS) receiver, a higher score may be assigned to the resource if the GPS receiver currently has a position fix as opposed to a GPS receiver which is attempting to determine a position. On the other hand, some types of resources may only have a single state, in which case this criteria may be omitted.

Regarding the "attributes" criteria in FIG. 9, this score can take into account any important attributes of the resource. Which attributes are important will depend on the resource type. For example, in the case of a display screen of a device, a higher score may be given to a larger display than a smaller display. Other examples of attributes include, but are not limited to, whether the display color or black-and-white images, the power consumption of the display, and the resolution, and any combination thereof. If the resource is a speaker, attributes could include maximum volume setting, power consumption level, and a quality metric, and any combination thereof. In the case of a storage unit such as a hard disk drive, attributes could include access speed and available capacity. These attributes and resource types are merely exemplary and are not limiting.

Regarding the "usage history" criteria in FIG. 9, this can be a score that is maintained by the device performing the ranking, and which takes into account such factors as whether the resource has been accessed previously, and if so, a performance level of the resource and observed reliability. For example, if a particular resource has been accessed frequently but has proven to be unreliable, the resource may be assigned a low score under "usage history". In the example shown in FIG. 9, the third resource has not previously been accessed by the present device and hence no usage history score is available.

As described above, resource ranking can be used to select a preferred resource when a plurality of different resources of the same type are available. Also, if the same resource is available through different paths, for instance, if a resource can be both directly accessed and indirectly accessed through a bridging device as described with reference to FIG. 8, the resource information for each different access path, defined in the location information, can be used to rank the alternative access paths to select a preferred location from which to obtain the resource.

Referring now to FIG. 10, a method for determining whether a resource is currently available is illustrated in table form, according to the exemplary embodiment of the present invention. In this exemplary embodiment, before selecting one of a plurality of resources, a device queries the other devices providing the plurality of resources to determine whether each resource is currently available. Unavailable resources can be removed from the selection process to ensure that only available resources can be selected.

The method shown in FIG. 10 can be performed either at the device which provides the resource, before responding to the availability query with a simple response indicating "yes" or "no" for availability, or can be performed at the device making the selection based on information received in response to the query.

In more detail, the example shown in FIG. 10 illustrates different availability states of five resources. A first resource, labeled 001, is classed as unavailable because the device providing the resource is not currently present, i.e. has left the network 120, or the networks 820-1, 820-2. A second resource, labeled 002, is available because the device is present and the resource is not currently in use. A third resource, labeled 003, is available because although the resource is currently in use, the resource supports parallel use, i.e. use by more than one device at a time. For example, parallel use may be supported by a media file, but not by a display screen. A fourth resource, labeled 004, is available because the resource is interruptible (INT) and the requesting device has a high priority. In this case it is irrelevant whether the resource is currently in use because the requesting device will be able to interrupt the resource to obtain access. Finally, a fifth resource, labeled 005, is unavailable because the resource is in use, parallel use is not supported, and the requesting device is not permitted to interrupt the previous user of the resource. Thus, the device determining whether a resource is currently available may query the other devices and may compile the table shown in FIG. 10, may store the table of FIG. 10 in memory or in a storage unit of the determining device, and may perform the method of FIG. 10 by scanning the table entries for resources which match a predetermined or input selection criteria for the resources to be accessed.

Referring now to FIG. 11, a system including two groups of devices is illustrated, according to the exemplary embodiment of the present invention. Specifically, in the exemplary embodiment there are five devices 1110-1, 1110-2, 1110-3, 1110-4, 1110-5, with all of the devices communicating via the same network 1120. However, not all of the devices are included in the same group. The first device 1101-1, the second device 1110-2, and third device 1110-3 are included in a first group 1131, while the third device 1110-3 is also part of a second group 1132 which includes the fourth device 1110-4 and the fifth device 1110-5. The different groups can be defined by different group identifiers (IDs). A group ID is shown in FIG. 3, where the resource catalog 310 includes a GROUP_ID to identify the group to which the resource information applies. In the case of the third device 1110-3 in FIG. 11, this device could store separate resource catalogs for the first group 1131 and the second 1132 group under different group IDs.

Defining different groups in this way enables different resources to be shared across different groups. For instance, the third device 1110-3 can share certain resources with the first group 1131 by sending resource information for those resources to the other devices 1110-1, 1110-2 in the first group 1131. Similarly, the third device 1110-3 can also share a different set of resources with the other devices 1110-4, 1110-5 in the second group 1132. This may be particularly advantageous when, for example, one group is set up to use authentication and the other group is set up as an open group which does not require authentication.

Figure 12:
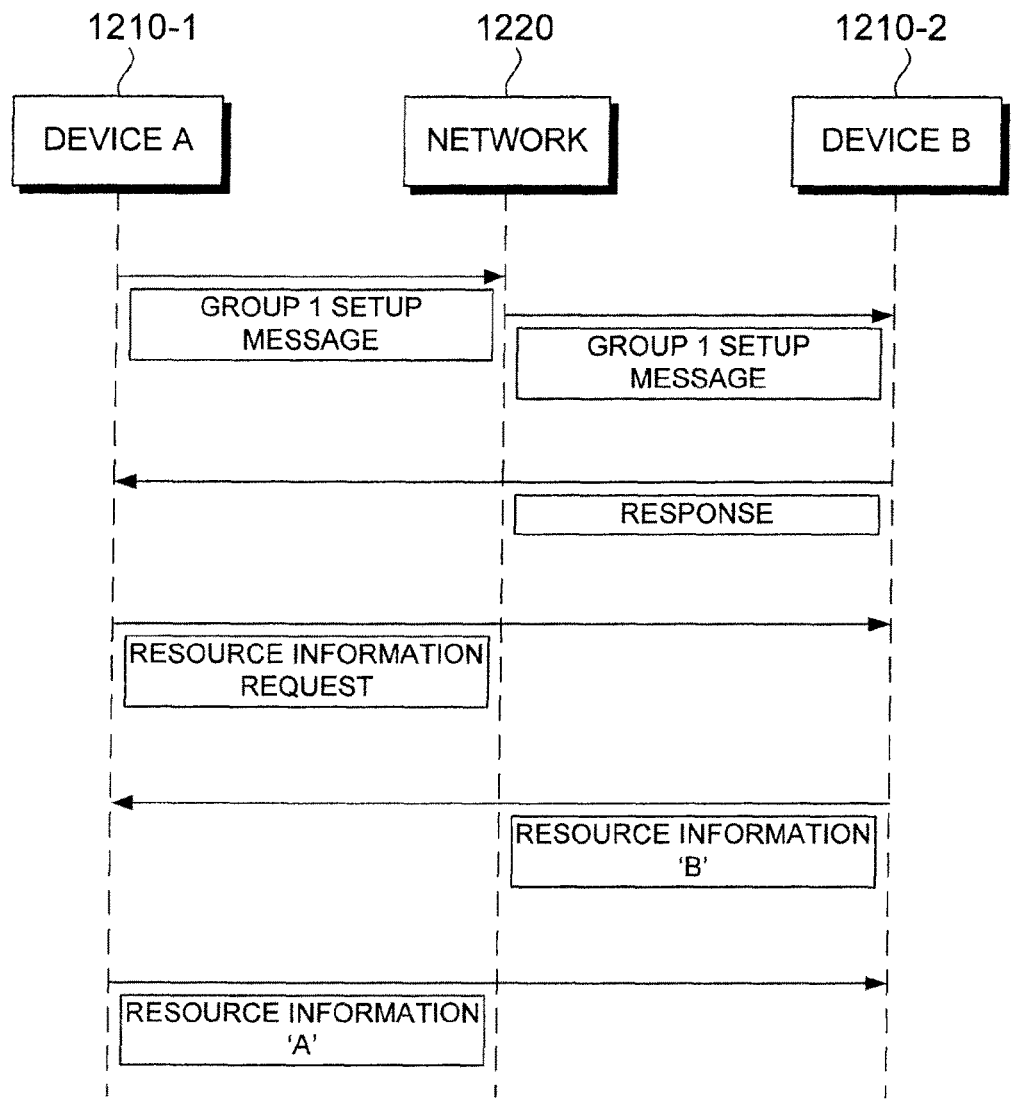
FIG. 12 illustrates a method sequence chart showing a method for setting up a group of devices, according to the exemplary embodiment of the present invention.

Referring now to FIG. 12, a method sequence chart showing a method for setting up a group of devices is illustrated, according to the exemplary embodiment of the present invention. To set up a new group of devices, i.e. if the group of devices does not already exist, a first device 1210-1, labeled Device A, broadcasts a group setup message over a network 1220.

In more detail, a device can attempt to join or set-up a group of devices whenever a predetermined condition is met. In the exemplary embodiment, the predetermined condition is based on location awareness, and the first device 1210-1 periodically obtains information about its location, for example using a GPS receiving module. Alternatively, in other exemplary embodiments the location determination may be made based on a WI-FI signal, by determining that the device is within range of a predetermined network, or using other information such as ambient sound detection. In response to the location information indicating that the device is at a predetermined location, the first device 1210-1 determines whether the group of devices exists by broadcasting a group search message including a predetermined group identifier for identifying the group, waiting a predetermined time, and determining that the group does not exist if a response indicating the existence of the group is not received from the network within the predetermined time. This approach ensures that other devices on the network are not required to respond unless the other devices are already part of the identified group, reducing a network traffic burden. In alternative exemplary embodiments however, instead of broadcasting a message including the predetermined group ID, the first device 1210-1 can broadcast a group search message to request other devices to respond with the group IDs of any existing groups to which the other devices already belong. The first device 1210-1 can then wait a predetermined time and compare the group IDs in any responses received in that time against the predetermined ID, to determine whether the group exists.

Referring back to FIG. 12, the group setup message is received by a second device 1210-2, labeled Device B, that is also connected to the network 1220. In response to the group setup message, the second device 1210-2 determines whether to join the new group. For example, the second device 1210-2 may request a user to select whether or not to join the group, or alternatively could automatically join any new group meeting certain criteria, for instance any new "open" group that does not require authentication.

If the second device 1210-2 determines or is instructed by the user to join the new group, the second device 1210-2 transmits a response message to the first device 1210-1 to confirm that the second device 1210-2 intends to join the group. Then, the first device 1210-1 requests resource information from the second device 1210-2, receives the resource information from the second device 1210-2, and in response transmits its own resource information to the second device 1210-2. At this point both devices 1210-1, 1210-2 have exchanged resource information and can now share their resources, and the group is set up.

Although in FIG. 12 a dedicated response to the group setup message is transmitted, and a dedicated request for resource information is transmitted, in some exemplary embodiments these steps and responses can be omitted. For example, instead of responding to the group setup message with a dedicated response, the second device 1210-2 could simply respond by transmitting the resource information to the first device 1210-1.

Figure 13:
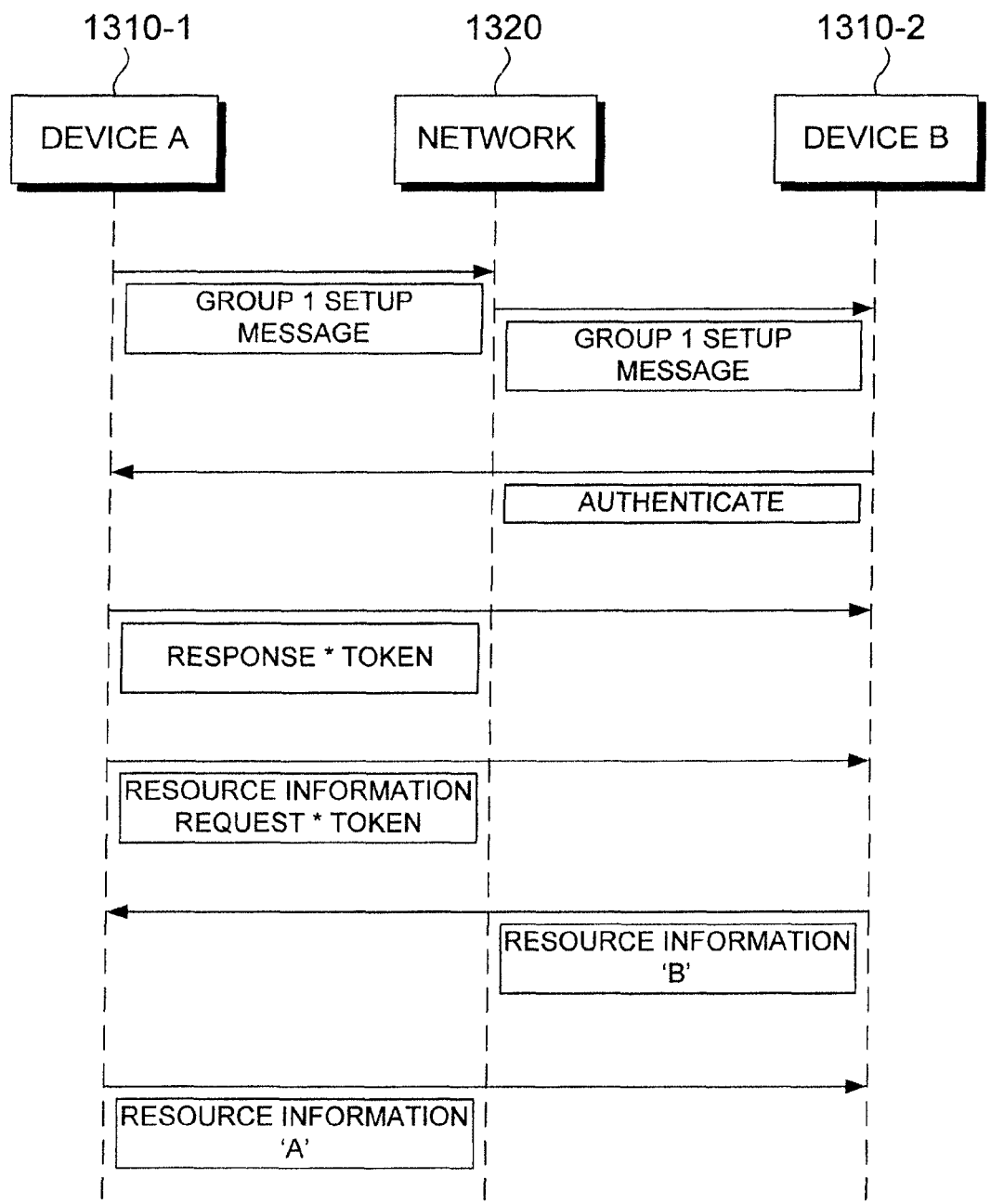
FIG. 13 illustrates a message sequence chart showing a method for setting up a group using authentication, according to the exemplary embodiment of the present invention.

Referring now to FIG. 13, a message sequence chart showing a method for setting up a group using authentication is illustrated, according to the exemplary embodiment of the present invention. The method is similar in some respects to the method of FIG. 12, and a detailed description of the similar steps will be omitted here to maintain brevity. In the exemplary embodiment, the group setup message broadcast by the first device 1310-1 over the network 1320 includes authentication information that identifies a type of authentication to be used in communications between the devices 1310-1, 1310-2 in the new group. Upon receipt of the group setup message, the second device 1310-2 requests to join the new group by starting a mutual authentication with the first device 1310-1. In response to the message from the second device 1310-2 being successfully authenticated by the first device 1310-1, the first device 1310-1 accepts the joining request from the second device 1310-2 and transmits an authorization token to the second device 1310-2. The authorization token is a token for use in authenticating communications between devices in the same group, which can be included in messages sent over the network to verify to a device receiving the message that the device originated from an authorized device. The second device 1310-2 stores the authorization token.

As shown in FIG. 13, when subsequently requesting the resource information from the second device 1310-2, the first device 1310-1 now includes the authorization token in the request message. The second device 1310-2 is therefore able to confirm, by comparison with the stored token, that the request message originated from an authorized device.

Figure 14:
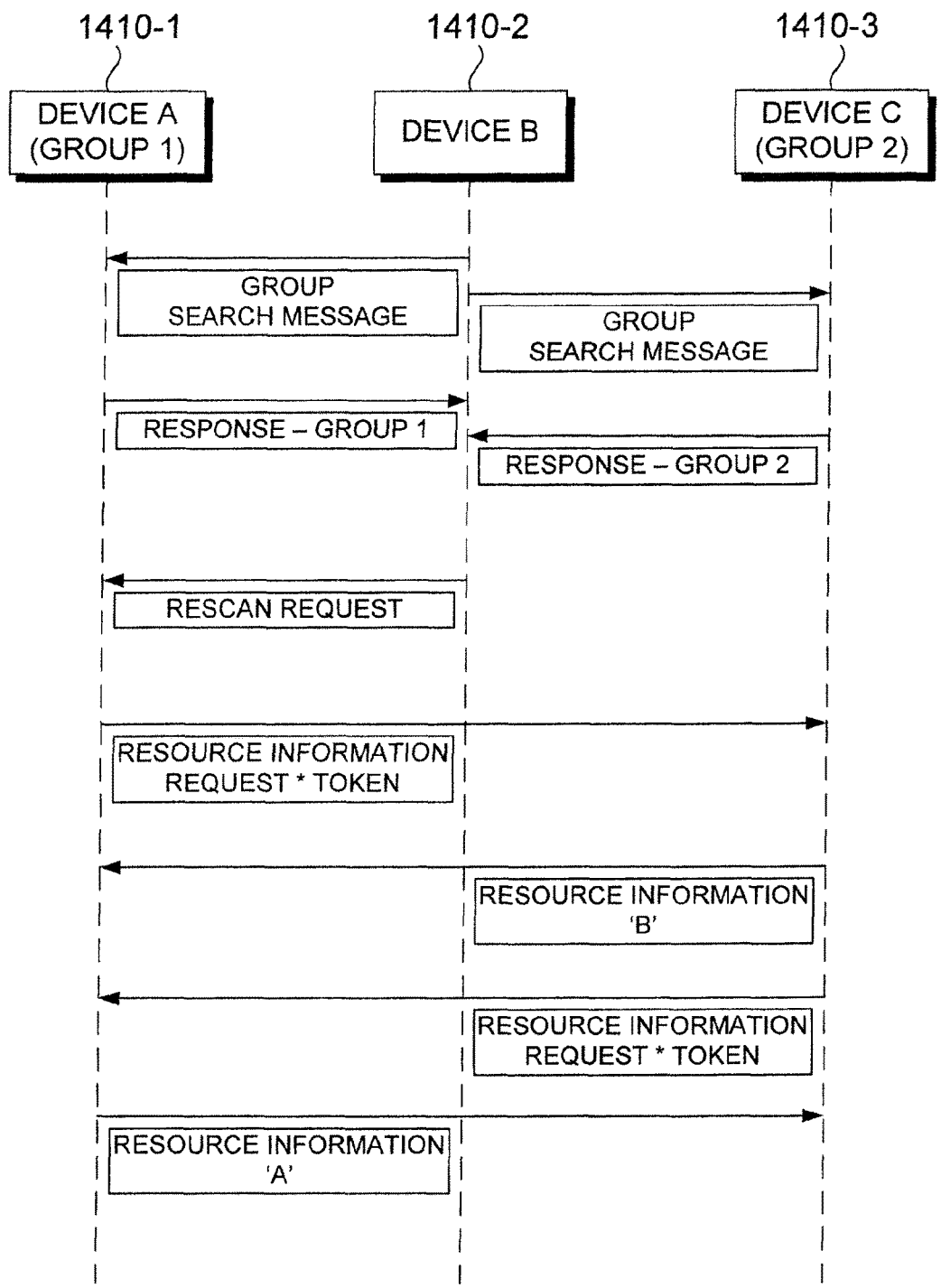
FIG. 14 illustrates a method sequence chart showing a method for reconnecting to a group using authentication, according to the exemplary embodiment of the present invention.

Referring now to FIG. 14, a message sequence chart showing a method for reconnecting to a group using authentication is illustrated, according to the exemplary embodiment of the present invention. In the present example, a second device 1410-2 is reconnecting to a network to which a first device 1410-1 and a third device 1410-3 are connected. The second device 1410-2 was previously connected to the network and was a member of Group 1, to which the first device 1410-1 also belongs. The third device 1410-3 is not included in Group 1, but is a member of a second group labeled Group 2.

Upon reconnecting the network, the second device 1410-2 broadcasts a group search message to determine whether Group 1 still exists, i.e. whether any devices included in Group 1 are still connected to the network. In the present example the group search message requires each device to respond with the group IDs of any groups to which each device belongs, although as described above, other approaches are possible in other exemplary embodiments. The first device 1410-1 responds with a message including the group ID of the first group, that is, Group 1, and the third device 1410-3 responds with a message including the group ID of the second group, that is, Group 2. At this point, the second device 1410-2 that Group 1 still exists because the first device 1410-1 is still connected to the network. In response to the determination that the Group 1 exists, the second device 1410-2 broadcasts a request to any devices in the first group Group 1 to rescan the group, to prompt each device to update its catalog 310, shown for example in FIG. 3, with the shared resources of the second device 1410-2.

In the exemplary embodiment, Group 1 is set up to use an authorization token to authenticate communications, as described above with reference to FIG. 13. Therefore the first device 1410-1, and any other devices in Group 1 still connected to the network, respond to the rescan request by sending a resource information request including the authorization token to the second device 1410-2. Because the second device 1410-2 was previously part of the first group Group 1, the second device 1410-2 already has the authorization token and can confirm that the request from the first device 1410-1 originated from an authorized device. Therefore the second device 1410-2 transmits its own resource information to the first device 1410-1, which adds the resource information to its own catalog 310. A similar message sequence follows for the second device 1410-2 to receive resource information from the first device 1410-1. At this point the second device 1410-2 has now rejoined the first group Group 1 and can resume sharing resources.

Exemplary embodiments of the present invention have been described in which devices receive resource information about shareable resources that are accessible through other devices on a network. In some exemplary embodiments, a device can store the received resource information for a predetermined time period and request updated resource information from the other device after the predetermined time period has expired. This ensures that an up-to-date record of shareable resources can be maintained. Also, in response to updated resource information not being received, the device can delete the stored resource information for the other device. This ensures that when a device leaves the network, other devices do not subsequently attempt to access the shareable resources of the departing device.

The above-described apparatus and methods according to the present invention can be implemented in hardware or firmware, or via the execution software or computer code, or combinations thereof. Various components such as a controller, a central processing unit (CPU), a processor, and any unit or device described herein includes at least hardware and/or other physical structures and elements. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

While certain exemplary embodiments of the present invention have been described above, the skilled person will appreciate that many variations and modifications are possible without departing from the scope of the invention as defined in the accompanying claims.

What is claimed is:

1. A terminal for communicating over a network with at least one another terminal within a group of devices, the terminal comprising:

a non-transitory computer readable medium storing a plurality of instructions which cause the terminal to:

broadcast a resource information request including a predetermined group identifier for identifying the group of devices, to request resource information from the at least one another terminal in the group, receive, directly from the at least one other terminal, resource information including resource identification for identifying remote resources directly accessible through the at least one other terminal and source information for identifying locations from which the remote resources can be obtained, wherein the resource identification includes a first identifier corresponding to a first remote resource accessible through one of the at least one other terminal and a second identifier corresponding to a second remote resource accessible through the one of the at least one other terminal, in response to a remote resource of the first remote resource and the second remote resource being selected, directly requests the selected remote resource from the one of the at least other terminal corresponding to a location identified by the source information, and determine whether the group of devices exists, directly request the resource information from the at least one other terminal if the group of devices exists, set up the group of devices if the group does not exist, by broadcasting a group setup message over the network to invite the at least one other terminal to join the group, and respond to a request from a specific device of the group of devices to join the group by authenticating the specific device, and transmit an authorization token to the specific device in response to a successful authentication result, the authorization token comprising a token for use in authenticating communications between devices in a same group.

2. The terminal of claim 1, wherein the terminal determines whether the group of devices exists by broadcasting a group search message including a predetermined group identifier for identifying the group, waiting a predetermined time, and determining that the group does not exist if a response indicating the existence of the group is not received from the network within the predetermined time.

3. The terminal of claim 1, wherein the terminal obtains location information about a current location of another terminal, and wherein the terminal determines whether the group of devices exists in response to the location information indicating that the another terminal is at a predetermined location.

4. The terminal of claim 1, wherein when resource information for a plurality of remote resources is received the terminal determines, based on the received resource identification, whether a specific remote resource of the plurality of remote resources can be obtained from a plurality of different locations, and wherein in response to a selection module selecting the specific remote resource, the terminal selects a preferred one of the plurality of different locations from which to request the specific remote resource based on predetermined criteria.

5. The terminal of claim 1, wherein a selection module ranks a plurality of remote resources according to at least one predetermined ranking criteria, before selecting a specific remote resource of the plurality of remote resources.

6. The terminal of claim 5, wherein the selection module ranks the plurality of remote resources based on, for each one of the plurality of resources, information about:
   a time since each remote resource was last accessed;
   a current state of each remote resource;
   an attribute score of each remote resource; or
   a usage history of each remote resource.

7. The terminal of claim 5, wherein the resource information includes type information for identifying type(s) of the remote resource(s), and wherein in response to the selection module selecting the specific remote resource of the plurality of remote resources, the terminal determines, based on the resource information, whether an alternative remote resource of a same type as the specific remote resource and having a higher ranking than the specific remote resource is available.

8. The terminal of claim 1, wherein the terminal transmits local resource information to another terminal in the group over the network, the local resource information comprising information about a remote resource accessible through the terminal.

9. The terminal of claim 1, wherein the terminal stores the received resource information for a predetermined time period and requests updated resource information from another terminal after the predetermined time period has expired, and wherein in response to updated resource information not being received, the terminal deletes the stored resource information for the another terminal.

10. The terminal of claim 1, wherein a selection module selects a specific remote resource of a plurality of remote resources in response to a user input, by providing a user with information about the plurality of remote resources and receiving a user command selecting the specific remote resource of the plurality of remote resources.

11. A terminal for communicating over a network with at least another terminal within a group of devices, the device comprising:
   a non-transitory computer readable medium storing a plurality of instructions which cause the terminal to:
   store a plurality of remote resources,
   generate resource information including resource identification for identifying remote resource(s) accessible through the terminal and source information for identifying a location from which a remote resource(s) can be obtained, wherein the resource identification includes a first identifier when the remote resource(s) accessible through the terminal includes a first remote resource and a second identifier when the remote resource(s) accessible through the terminal is a second remote resource,
   transmit the resource information directly to the at least one another terminal over the network,
   receive a request to use a resource of the remote resource (s) or a group setup message to invite the terminal to join the group directly from another terminal,
   in response to receiving the request or the group setup message, determine whether the group of devices exists,
   if the group of devices exist, in response to the request, provide the requested remote resource directly to the another terminal,
   if the group of devices exist, in response to the group setup message, transmitting a request to join the group by authenticating the terminal to the another terminal,
   in response to transmitting the request to join the group, receive an authorization token in response to a successful authentication result of the another terminal from the another terminal, the authorization token comprising a token for use in authentication communication between devices in a same group.

12. The terminal of claim 11, wherein the terminal communicates over a first network according to a first network protocol and communicates over a second network according to a second network protocol,
   wherein the group of devices includes a first other device on the first network and a second other device on the second network, and
   wherein in response to a request for resource information from the first other device, the terminal directly transmits resource information about a remote resource provided by the second other device and accessible through the terminal.

13. The terminal of claim 12, wherein in response to the request from the first other device to access the remote resource provided by the second other device, the terminal requests the remote resource from the second other device and provides the remote resource provided by the second other device to the first other device.

14. The terminal of claim 11, wherein the request received from the another terminal includes a group identifier for identifying the group of devices, and wherein the terminal determines whether authentication is required in the identified group, and in response to a determination that authentication is required, the terminal authenticates the another terminal before providing the requested remote resource.

15. A method for use in terminal for communicating over a network with at least one another terminal within a group of devices, the method comprising:
   broadcasting a resource information request including a predetermined group identifier for identifying the group of devices, to request resource information from the at least one another terminal in the group;
   receiving, directly from another terminal, resource information including resource identification for identifying remote resource(s) directly accessible through the another terminal, wherein the resource identification includes a first identifier when the remote resource(s) includes a first remote resource directly accessible through the another terminal and a second identifier when the remote resource(s) a second remote resource directly accessible through the another terminal, and source information for identifying a location from which the remote resource(s) can be obtained;
   selecting a specific remote resource of the remote resource(s);
   requesting the specific remote resource directly from the another terminal corresponding to the location identified by the source information, in response to the specific remote resource being selected;
   determining whether the group of devices exists;
   directly requesting the resource information from the another terminal if the group of devices exists;
   setting up the group of devices if the group does not exist, by broadcasting a group setup message over the network to invite the another terminal to join the group;
   responding to a request from a specific device of the group of devices to join the group by authenticating the specific device; and
   transmitting an authorization token to the specific device in response to a successful authentication result, the authorization token comprising a token for use in authenticating communications between devices in a same group.

16. The method of claim 15, wherein determining whether the group of devices exists comprises:
broadcasting a group search message including a predetermined group identifier for identifying the group;
waiting a predetermined time; and
determining that the group does not exist if a response indicating the existence of the group is not received from the network within the predetermined time.

17. The method of claim 15, further comprising:
obtaining location information about a current location of the terminal;
wherein it is determined whether the group of devices exists in response to the location information indicating that the another terminal is at a predetermined location.

18. The method of claim 15, wherein when resource information for a plurality of remote resources is received, the method further comprises:
determining based on received resource identification, whether the specific remote resource of the remote resource(s) can be obtained from a plurality of different locations; and
selecting a preferred location of the plurality of different locations from which to request the remote resource based on predetermined criteria, in response to the specific remote resource being selected.

19. The method of claim 15, further comprising:
ranking a plurality of remote resources according to at least one predetermined ranking criteria, before selecting a specific remote resource of the plurality of remote resources.

20. The method of claim 19, wherein the plurality of remote resources are ranked based on, for each of the plurality of remote resources, information about:
a time since the remote resource was last accessed;
a current state of the remote resource;
an attribute score of the remote resource; or
a usage history of the remote resource.

21. The method of claim 19, wherein the resource information includes type information for identifying type(s) of the remote resource(s), the method further comprising:
determining, based on the resource information, whether an alternative remote resource of a same type as the specific remote resource and having a higher ranking than the specific remote resource is available, in response to the specific remote resource being selected.

22. The method of claim 15, further comprising:
transmitting local resource information to the another terminal over the network, the local resource information comprising information about a remote resource accessible through the terminal.

23. The method of claim 15, further comprising:
storing the received resource information for a predetermined time period;
requesting updated resource information from the at least one other device after the predetermined time period has expired; and
deleting the stored resource information for the at least one other device, in response to updated resource information not being received.

24. The method of claim 15, wherein selecting the specific remote resource:
providing a user with information about the remote resource(s); and
receiving a user command selecting the specific remote resource.

25. A method for use in a terminal for communicating over a network with at least one another terminal within a group of devices, the method comprising:
storing a plurality of remote resources,
generating resource information including resource identification for identifying remote resource(s) accessible through the terminal and source information for identifying location(s) from which a remote resource(s) can be obtained, wherein the resource identification includes a first identifier when the remote resource(s) includes a first remote resource directly accessible through the another terminal and a second identifier when the remote resource(s) a second remote resource directly accessible through the another terminal;
transmitting the resource information directly to the at least one another terminal over the network;
receiving a request to use a resource of the remote resource(s) or a group setup message to invite the terminal to join the group directly from another terminal; and
in response to receiving the request or the group setup message, determining whether the group of device exists,
if the group of devices exist, in response to the request, providing the requested remote resource directly to the another terminal,
if the group of devices exist, in response to the group setup message, transmitting a request to join the group by authenticating the terminal to the another terminal,
in response to transmitting the request to join the group, receive an authorization token in response to a successful authentication result of the another terminal from the another terminal, the authorization token comprising a token for use in authentication communication between devices in a same group.

26. The method of claim 25, wherein the terminal communicates over a first network according to a first network protocol and communicates over a second network according to a second network protocol;
wherein the group of devices includes a first other device on the first network and a second other device on the second network, and
wherein in response to a request for resource information from the first other device, resource information about a remote resource provided by the second other device and accessible through the terminal is transmitted to the first other device.

27. The method of claim 26, further comprising:
requesting the remote resource from the second other device to provide the remote resource to the first other device, in response to a request from the first other device to access the remote resource.

28. The method of claim 25, wherein the request received from the another terminal includes a group identifier for identifying the group of devices, the method further comprising:
determining whether authentication is required in the identified group; and
authenticating the another terminal before providing the requested remote resource, in response to a determination that authentication is required.

* * * * *